United States Patent Office 3,532,796
Patented Oct. 6, 1970

3,532,796
METHOD OF TREATING INFLAMMATION
Troy L. Kerley, Northridge, and Louis Levy, Encino, Calif., assignors, by mesne assignments, to Riker Laboratories, Inc., Northridge, Calif., a corporation of Delaware
No Drawing. Filed Mar. 8, 1968, Ser. No. 711,524
Int. Cl. A61k *27/00*
U.S. Cl. 424—330                                                 1 Claim

ABSTRACT OF THE DISCLOSURE

A method of alleviating the symptoms of inflammation in an animal suffering from an inflammatory condition which comprises the administration to such an animal of a pharmaceutically effective amount of N,N'-diphenyl-p-phenylenediamine.

---

This invention relates to a method of treating inflammation in animals.

The invention sought to be patented resides in the concept of a method of alleviating the symptoms of inflammation which comprises the administration, to an animal suffering such symptoms, of a pharmaceutically effective nontoxic amount of N,N'-diphenyl-p-phenylenediamine.

The manner and process of making and using the invention will now be described generally so as to enable one skilled in the pharmaceutical arts to make and use the same as follows:

In accordance with the method of this invention N,N'-diphenyl-p-phenylenediamine is adminstered, to an animal suffering from the symptoms of inflammation, in a nontoxic amount sufficient to alleviate such symptoms. In carrying out the method, the active ingredient is normally combined with conventional pharmaceutical diluents and carriers which are selected based upon the desired route of administration. The oral route is preferred due to ease of administration and subject acceptance. In carrying out the method, the active ingredient can, if desired, be combined with other therapeutically active compositions customarily included in anti-flammatory formulations.

The individual unit dosage and frequency of administration is determined not only by the nature and severity of the inflammatory condition for which relief is sought, but in addition upon age, weight, species, underlying physical condition and route of administration. The exact amount to be administered should be nontoxic, yet pharmaceutically effective in alleviating the symptoms of the inflammatory condition.

The best mode contemplated by the inventor for carrying out this invention will now be set forth as follows:

The N,N'-diphenyl-p-phenylenediamine used in the practice of this invention is a known compound, first described by Calm, Ber. 16: 2805 (1883), that is commercially available or readily prepared by condensing hydroquinone or p-aminophenol with aniline. A useful process for such condensation of hydroquinone an aniline is described in U.S. Pat. 2,503,712.

The following examples present pharmacological data establishing the anti-inflammatory activity of N,N'-diphenyl-p-phenylenediamine.

EXAMPLE 1

Acute toxicity determinations, in accordance with standard pharmacological test procedures, made for the compound according to the present invention, N,N'-diphenyl-p-phenylenediamine, and two known standard anti-inflammatory agents, $11\beta$, $17\alpha$, 21-trihydroxy-1,4-pregnadiene-3,20-dione (prednisolone) and 1-(p-chlorobenzoyl)-5-methoxy-2-methylindole-3-acetic acid (Indomethacin) reveal the following:

| Compound | Animal | Route | $LD_{50}$, mg./kg. |
| --- | --- | --- | --- |
| N,N'-diphenyl-p-phenylenediamine | Rat | Oral | >2,000 |
| Prednisolone acetate | Mouse | I.p. | >800 |
|  | Rat | Oral | >2,000 |
| Indomethacin base | Mouse | I.p. | 282 |
|  | Rat | Oral | 800 |

EXAMPLE 2

The comparative effect on an inflammatory condition known as adjuvant-induced polyarthritis in rats was determined for N,N'-diphenyl-p-phenylenediamine and the known anti-inflammatory agent, prednisoloe. The method used was that described by Ward and Cloud, J. Pharm. Expetl. Therap. 152: 116–121 (1966).

The arthritic syndrome is induced by intradermal injection, into the plantar surface of one hind paw of a rat of 0.1 ml. of a fine suspennion of dead tubercular bacilli in mineral oil. The rats used are Carworth males of approximately 200 g. body weight. Each group, including an untreated control group, consists of six animals. The drugs are administered orally in the diet beginning on the day of adjuvant injection.

Paw size is measured by immersion of the hind paw into a pool of mercury. The pressure increase caused by the slight rise in mercury level is transmitted to a venous pressure transducer designed to transmit a signal to a recording polygraph. The polygraph is calibrated by introduction of known volumes into the mercury and measuring pen excursion in millimeters, this being converted to milliliters to indicate mercury displacement and, hence, volume of edematous fluid in the immersed limb. The measurement method together with equipment typically employed is described by Van Arman et al., J. Pharm, Exptl. Therap. 150: 328–344 (1965).

In the control animals, swelling and redness in the injected hindlimb comprises an inflammatory reaction that subsides somewhat after about 8 to 9 days and then increases with the appearance of disseminated arthritis. The systemic effects of the induced polyarthritis are also evident in the contralateral, non-injected hindlimb by swelling to a lesser degree. In the experimental animals the inflammatory reaction is characterized by the same pattern of swelling and redness followed by subsidence and subsequent increase, but the reaction at all stages is considerably inhibited in direct relationship to the anti-inflammatory activity of the drug administered.

The following tables summarize the inhibitory effect of N,N'-diphenyl-p-phenylenediamine in comparison to that produced by prednisolone.

(A) Effect on injected hindpaw (left):

| Drug and dose, mg./kg. | Paw volume (ml. ± std. deviation) | | | |
|---|---|---|---|---|
| | Start, day 0 | Day 7 | Day 14 | Day 21 |
| Control | 1.51±0.06 100% | 2.44±0.24 162% | 3.07±0.52 203% | 3.74±0.55 244% |
| Prednisolone, 2 mg./kg. | 1.42±0.0 100% | 1.76±0.13 124% | 2.01±0.18 142% | 2.23±0.40 157% |
| N,N'-diphenyl-p-phenylenediamine, 200 mg./kg. | 1.36±0.03 100% | 1.95±0.16 143% | 2.09±0.14 154% | 2.24±0.21 165% |

(B) Effect on non-injected hindpaw (right):

| Drug and dose, mg./kg. | Paw volume (ml. ± std. deviation) | | | |
|---|---|---|---|---|
| | Start, day 0 | Day 7 | Day 14 | Day 21 |
| Control | 1.38±0.06 100% | 1.56±0.10 113% | 2.06±0.75 149% | 2.70±0.72 196% |
| Prednisolone, 2 mg./kg. | 1.28±0.06 100% | 1.34±0.12 105% | 1.25±0.05 98% | 1.25±0.10 98% |
| N,N'-diphenyl-p-phenylenediamine, 200 mg./kg. | 1.26±0.13 100% | 1.39±0.08 110% | 1.34±0.11 106% | 1.42±0.19 113% |

The results of this experiment show that the compound N,N'-diphenyl-p-phenylenediamine compares favorably with the known anti-inflammatory agent prednisolone in inhibiting the development of adjuvant-induced polyarthritis in rats.

EXAMPLE 3

Using the technique described in Example 2, the effect of N,N'-diphenyl-p-phenylenediamine upon an established, pre-existing inflammatory condition was determined. In this test drug administration was begun 7 days after injection of adjuvant, and after development of the adjuvant polyarthritis inflammatory condition. The N,N'-diphenyl-p-phenylenediamine was given at three dose levels and paw volume measured of the injected paw 7, 14 and 21 days after drug administration was begun. The drug was administered daily in the animal's normal diet and dosages indicated represent mg./kg./day. As a positive control a group of animals received the known anti-inflammatory agent indomethacin.

methylindole-3-acetic acid (indomethacin). The method used was that described by Winter et al., Proc. Soc. Exptl. Biol. & Med. 111: 544–547 (1962).

The edema is induced by injection into the plantar surface of the right hind paw of a rat, of carrageenin, prepared as a 1% suspension in sterile 0.9% sodium chloride solution. The volume injected is 0.05 ml. The volume of the paw is measured immediately after injection with carrageenin and again three hours later. The difference in volume between the two measurements indicates the increase due to swelling caused by edematous fluid. Volume measurements are made as described in Example 2.

One hour before injection with carrageenin the test animals are administered the drug in a 20% corn oil and water emulsion by intubation in a volume of 5.0 ml. per rat. The control animals receive 5.0 ml. of a 20% corn oil and water emulsion.

The following chart shows the percentage of inhibition caused by N,N'-diphenyl-p-phenylenediamine and indomethacin.

| Group | Dose, mg./kg. | Percent inhibition |
|---|---|---|
| Control | | 0 |
| Indomethacin | 3 | 63, 46 → 55 |
| N,N'-diphenyl-p-phenylenediamine | 10 | 7 |
| | 30 | 29 |
| | 100 | 79, 51 → 65 |
| | 200 | 83 |
| | 400 | 82 |

These results show that N,N'-diphenyl-p-phenylenediamine compares favorably with the known anti-inflammatory agent indomethacin.

EXAMPLE 5

The comparative effect on carrageenin-induced edematous abscesses in the base of the tail in the rat was also determined for N,N'-diphenyl-p-phenylenediamine and the well-known antiinflammatory agent prednisolone. The method used was a modification of that described by Benitz and Hall, Arch. Int. Pharmacodyn. 144:185–195 (1963). In this modification female Carworth rats of approximately 140 g. body weight are used. The rats are injected subcutaneously with 0.5 ml. of a 2.0% solution of carrageenin into an area 2 to 3 cm. rostral to the base EFFECT OF N,N'-DIPHENYL-p-PHENYLENEDIAMINE ON ESTABLISHED INFLAMMATORY CONDITION

| Group and dose | Volume (ml.)[1] | | Volume (ml.)[2] | | |
|---|---|---|---|---|---|
| | Preinjection | 7 days post-injection | Days after drug started | | |
| | | | 7 | 14 | 21 |
| Control | | | 3.47±0.70 304% | 4.15±0.97 364% | 4.59±1.08 403% |
| Indomethacin, 1 mg./kg. | | | 2.42±0.08 212% | 2.20±0.16 193% | 2.16±0.26 189% |
| N,N'-diphenyl-p-phenylenediamine, 50 mg./kg. | 1.14±0.09 100% | 3.11±0.28 273% | 2.77±0.43 243% | 2.54±0.50 223% | 2.68±0.11 235% |
| N,N'-diphenyl-p-phenylenediamine, 100 mg./kg. | | | 2.55±0.17 224% | 2.18±0.15 191% | 2.11±0.10 185% |
| N,N'-diphenyl-p-phenylenediamine, 200 mg./kg. | | | 2.55±0.10 224% | 2.23±0.08 196% | 2.04±0.16 179% |

[1] Each figure represents 30 animals.
[2] Each figure represents 6 animals.

There results show that the compound N,N'-diphenyl-p-phenylenediamine is capable of arresting further development of an existing inflammatory condition and maintaining it at or below pretreatment levels.

EXAMPLE 4

The comparative effect on carrageenin-induced edema in the hind paw of the rat was also determined for N,N'-diphenyl-p-phenylenediamine and the well-known anti-inflammatory agent 1-(p - chlorobenzoyl) - 5 - methoxy-2- of the tail at the midline of the back. After 24 hours the animals are sacrificed by chloroform inhalation. A V-shaped incision is made above the site of injection and the skin reflected so as to expose the underlying musculature. The carrageenin-induced edematous abscess, which can be easily distinguished from the surrounding tissues, is dissected out as completely as possible, placed in a small beaker, and is weighed.

The prednisolone standard and the N,N'-diphenyl-p-phenylenediamine are administered orally by intubation 30 minutes before the carrageenin is injected. Untreated control animals receive an intubation of water 30 minutes before injection with carrageenin.

The following table summarizes the inhibitory effect of N,N'-diphenyl-p-phenylenediamine in comparison to that of prednisolone on carrageenin-induced edematous abscesses. There were five animals in each group.

| Group | Dose, mg./kg. | Weight of abscessed (gm.) | Percent of control |
|---|---|---|---|
| Control | | 1.617±0.130 | 100 |
| N,N'-diphenyl-p-phenylenediamine | 100 | 1.042±0.270 | 64 |
| Prednisolone | 12 | 1.224±0.246 | 76 |

The results show that N,N'-diphenyl-p-phenylenediamine compares favorably with prednisolone in inhibiting the development of carrageenin-induced edematous abscesses.

The subject matter which the applicants regard as their invention is particularly pointed out and distinctly claimed as follows:

1. A method of alleviating the symptoms of inflammation which comprises the administration to an animal suffering such symptoms of N,N'-diphenyl-p-phenylenediamine in a pharmaceutically effective non-toxic amount sufficient to alleviate said symptoms of inflammation.

References Cited

Chemical Abstracts 61:4765f (1964).

ALBERT T. MEYERS, Primary Examiner

J. D. GOLDBERG, Assistant Examiner